United States Patent  
Caves

(10) Patent No.: US 6,636,514 B1  
(45) Date of Patent: Oct. 21, 2003

(54) TELECOMMUNICATIONS SYSTEM

(75) Inventor: Keith Caves, Sawbridgeworth (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/198,223

(22) Filed: Nov. 23, 1998

(30) Foreign Application Priority Data

Aug. 10, 1998 (GB) ................................. 9817411

(51) Int. Cl.[7] ................................. H04L 12/66
(52) U.S. Cl. ................................. 370/395.1; 370/410
(58) Field of Search .................... 370/395.1, 395.2, 370/395.6, 395.64, 395.65, 401, 410, 466, 467, 352

(56) References Cited

U.S. PATENT DOCUMENTS

| 5,333,187 A | * | 7/1994 | Hiraiwa et al. | 379/219 |
|---|---|---|---|---|
| 5,437,009 A | * | 7/1995 | Lane | 395/349 |
| 5,848,070 A | * | 12/1998 | Durvaux et al. | 370/442 |
| 5,881,059 A | * | 3/1999 | Deschaine et al. | 370/337 |
| 5,974,052 A | * | 10/1999 | Johnson et al. | 370/467 |
| 6,108,336 A | * | 8/2000 | Duault et al. | 370/395.6 |
| 6,169,735 B1 | * | 1/2001 | Allen et al. | 370/352 |
| 6,301,250 B1 | * | 10/2001 | Schmitz | 370/395.61 |
| 6,345,051 B1 | * | 2/2002 | Gupta et al. | 370/395 |
| 6,347,088 B1 | * | 2/2002 | Katou et al. | 370/395.2 |
| 6,363,079 B1 | * | 3/2002 | Barzegar et al. | 370/465 |
| 6,370,155 B1 | * | 4/2002 | Cantwell et al. | 370/465 |
| 6,434,151 B1 | * | 8/2002 | Caves et al. | 370/395.2 |

FOREIGN PATENT DOCUMENTS

| GB | 2 305 812 | 4/1997 |
|---|---|---|
| WO | WO 98/24263 | 6/1998 |

OTHER PUBLICATIONS

Liu, "Impacts of Signalling—Intensive Local Services (SILS) . . . ", Computer Networks and ISDN Systems, vol 25, No. 1, Aug. 17, 1992, pp 121–143.

* cited by examiner

Primary Examiner—Melvin Marcelo  
Assistant Examiner—Jasper Kwoh  
(74) Attorney, Agent, or Firm—Barnes & Thornburg

(57) ABSTRACT

The use of multiple AAL2 virtual circuits to support narrow band calls with multiple types of narrow band signalling systems leads to inefficient use of bandwidths over an ATM network. The present invention provides a method of transporting narrow band calls of multiple narrow band signalling type between narrow band networks across a single virtual circuit in an ATM network, where for each call connection within a circuit the call connection signalling information includes the narrow band signalling type.

8 Claims, 4 Drawing Sheets

TELECOMMUNICATIONS SYSTEM

FIELD OF THE INVENTION

This invention relates to telecommunications networks and in particular a system and method for asynchronous transfer mode (ATM) transmission of traffic.

BACKGROUND OF THE INVENTION

ATM technology is a flexible form of transmission which allows various types of service traffic, e.g. Voice, video or data, to be multiplexed together onto a common means of transmission, the traffic being carried in cells each having a header indicating its destination. Service traffic is adapted typically into 53 byte cells comprising 5 byte headers and 48 byte payloads such that the original traffic can be reconstituted at the far end of the ATM network. This form of adaption is performed in the ATM adaption layer (ML). The technique allows large volumes of traffic to be handled reliably and efficiently.

A limiting factor in the introduction of ATM is the difficulty of interfacing new broadband ATM networks with existing narrowband networks. The presently proposed AAL2 ATM trunking for narrowband services encapsulates and transports short user information packets inside an ATM cell stream. AAL2 allows multiple narrowband users to share a single ATM virtual circuit—in this manner the length of each user packet can be kept short to minimise packetisation delay, whilst the overall bandwidth efficiency of the VCC is maintained. However, as presently proposed, a single AAL2 virtual circuit can only support AAL2 connections which are controlled by the same type and variant of narrowband signalling system. In general, transmission facilities terminating on a single interworking function (IWF) may each carry a different narrowband signalling system, or a single transmission facility may carry multiple narrowband signalling systems. In either case, this requires the IWF to terminate and process multiple different narrowband signalling systems. This means that as presently proposed, in order to transport user data across the ATM network, the IWF would need to initiate multiple AAL2 virtual circuits, one for each narrowband signalling system terminated. At present it is not otherwise possible for the narrowband signalling handling function at the receiving IWF to determine which signalling system to associate with an individual narrowband call. This information is required so that the receiving IWF can successfully process the signalling information in order to provide onward routing of the call.

The use of multiple AAL2 virtual circuits to overcome this problem leads to an inefficient use of bandwidth, especially when an AAL2 virtual circuit has only a few calls to support.

OBJECT OF THE INVENTION

It is an object of the present invention to minimise or to overcome these disadvantages.

It is a further object of the present invention to provide an improved apparatus and method for the transport of narrowband communications traffic over ATM networks.

SUMMARY OF THE INVENTION

In a first aspect the present invention provides a method of transporting narrowband calls of multiple narrowband signalling type between first and second narrow band networks across a virtual circuit in an ATM network, wherein for each call connection within said circuit the call connection signalling information includes the narrowband signalling type.

Preferably the call connection signalling information is a data packet comprising a narrowband signalling type field.

In a second aspect the present invention provides a method of transporting narrowband calls of multiple narrowband signalling type between first and second narrow band networks across an ATM network; the method comprising:
  forming a virtual circuit;
  forming call connections within said circuit with a call connection signalling information data packet comprising a narrowband signalling type field containing the narrowband signalling type of said call.

In a third aspect the present invention provides an apparatus for transporting narrowband calls of multiple narrowband signalling type between first and second narrow band networks across an ATM network, the apparatus comprising:
  means for forming a virtual circuit;
  means for forming call connections within said circuit by forwarding a call connection signalling information data packet comprising a narrowband signalling type field containing the narrowband signalling type of said call.

In a fourth aspect the present invention provides an apparatus for transporting narrowband calls of different signalling type between first and second narrow band networks across an ATM network, the apparatus comprising:
  means for forming a virtual circuit;
  means for forming call connections within said circuit by receiving a call connection data packet comprising a narrowband signalling system type field containing the narrowband signalling system type of said call.

Preferably said means is an interworking function.
Preferably said virtual circuit is an AAL2 virtual circuit.

In a further aspect the present invention provides a telecommunications system for transporting narrowband calls of different signalling type between first and second narrow band networks across an ATM network, the system comprising:
  means for forming a virtual circuit between two interworking functions (IWF);
  means for forming call connections within said circuit by transferring between said IWFs a call connection data packet comprising a narrowband signalling system type field containing the narrowband signalling system type of said call.

BRIEF DESCRIPTION OF THE DRAWINGS

In order that a greater understanding of the invention can be obtained, an embodiment of the invention will now be described with reference to the accompanying drawings by way of example only and without intending to be limiting, in which.

DESCRIPTION OF THE PREFERRED EMBODIMENT

Figure 1:
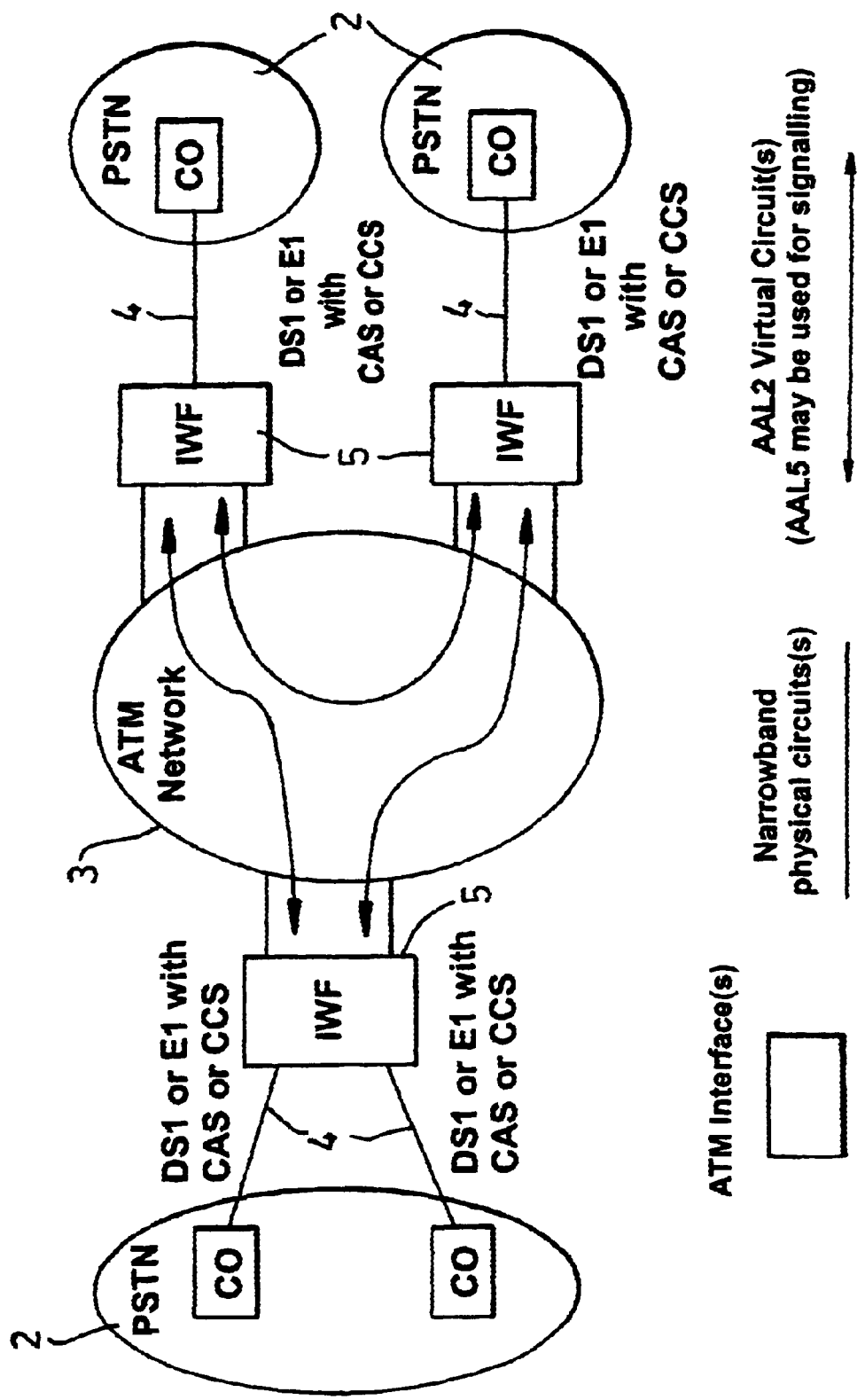
FIG. 1 is a schematic diagram of a telecommunications system comprising narrowband services connected over an ATM network.

FIG. 1 shows a telecommunications system comprising a plurality of narrowband networks 2 such as public switch telephone networks or wireless networks, connected by an ATM network 3. The narrowband networks 2 are connected to the ATM network 3 by narrowband transmission facilities 4 such as E1 or DS1, which terminate at the ATM network 3 in an interworking function (IWF) 5.

Figure 2:
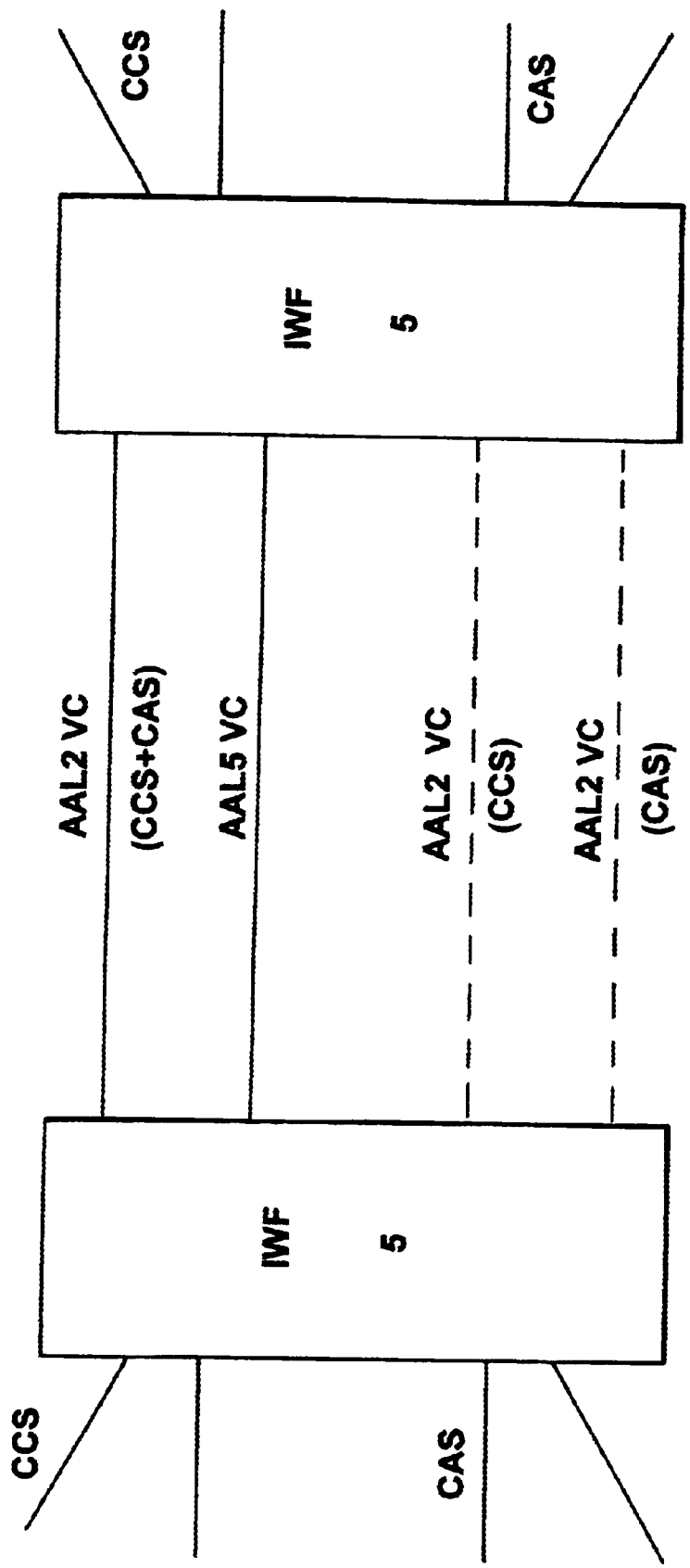
FIG. 2 is a schematic diagram showing virtual circuit connections between the ATM network IWF's.

In the ATM network structure 3, narrowband channels are transported across the network 3 between pairs of IWF's 5, each providing an interface between the respective narrowband network transmission facility 4 and the ATM network 3, as shown in FIG. 2. The IWF 5 will process any incoming narrowband calls to determine a suitable outgoing route (to another IWF 5) as well as performing other functions such as compression and in the case of voice or voice band data calls suppressing silent intervals. The IWF 5 also performs an ATM adaption layer function using AAL type 2 to adapt user data and signalling information into packets or minicells—said packets are multiplexed into the AAL2 virtual circuit (VC) for transport across the ATM network 3 to a receiving IWF5. Each user is allocated a unique channel within the AAL2 VC. The receiving IWF retrieves the packets and reassembles the narrowband call. In this way packets of user information from different users may be multiplexed onto a single AAL2 VC.

The narrowband signalling information, associated with each individual call being transported between IWF's5 is similarly transported either in a given AAL2 channel within the AAL2 VC, or in a separate. AAL5 VC, as shown schematically in FIG. 2. This information is similarly retrieved by the receiving IWF's which provides information on the forward routing of a particular narrowband call for example. However the different types of variants of narrowband signalling systems used require the receiving IWF to be able to associate a particular narrowband call with the type of signalling system used to retrieve for example the required forward routing information to complete the call.

Upon establishment of an AAL2 VC, a unique AAL2 channel is allocated for the narrowband signalling information associated with the calls to be transported by the newly set up VC. Alternatively, the narrowband signalling information may be transported within a separate AAL5 VC.

In prior art arrangements as shown in phantom outline in FIG. 2, the association of narrowband calls with the type of signalling system in which the call was terminated at the sending IWF is achieved by the use of VCs which are dedicated to a particular signalling type. The receiving IWF's thus know that all calls received on a particular VC will be of a predetermined signalling type, this signalling information then being retrievable from the dedicated AAL2 channel or AAL5 VC allocated to it.

However, as described above, the use of separate VC's for each narrowband call signalling type leads to inefficient use of the VC's and hence inefficient use of bandwidth within the ATM network, especially when an AAL2 VC has only a few calls of a given signalling type to support. The invention achieves much greater multiplexing gain by combining all narrowband calls, irrespective of their associated narrowband signalling system, onto the same AAL2 VC, as shown in FIG. 2 by the solid line circuits.

Figure 3:
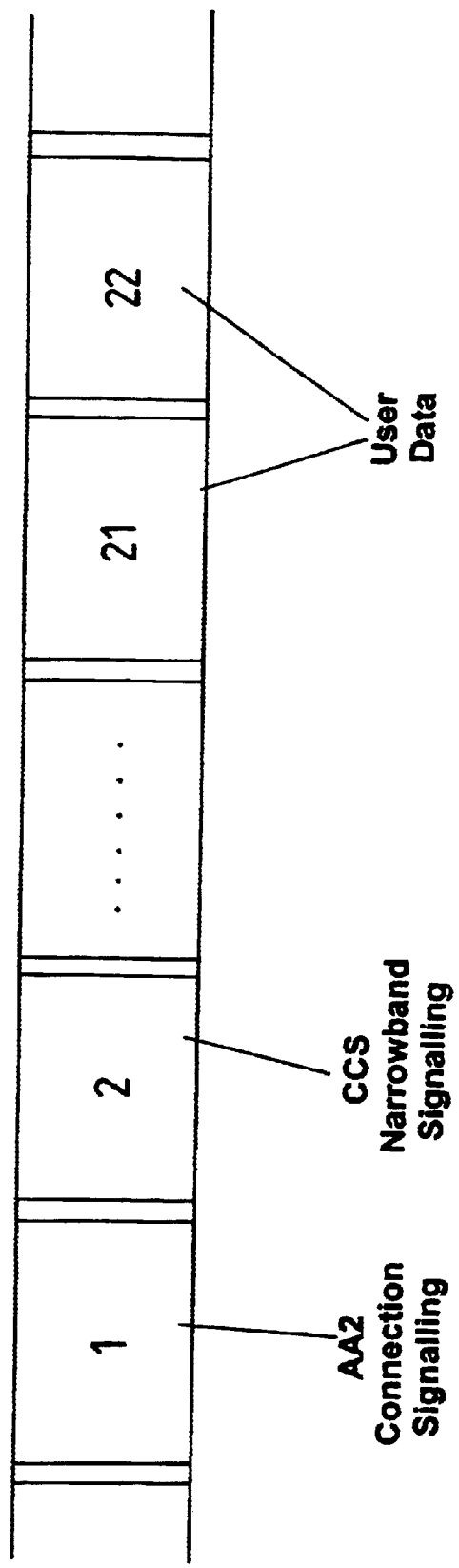
FIG. 3 is a schematic diagram showing an AAL2 virtual circuit data stream.

FIG. 3 shows an AAL2 VC data stream which, for the purposes of illustration only, comprises a channel 1 dedicated to AAL2 connection control signalling messages for setup and termination of calls within the VC; a channel 2 dedicated to carrying (for example) a Common Channel Signalling (CCS) channel to provide the narrow band signalling for the narrowband calls terminating at the sending IWF which support this type of signalling. The other channels shown comprise user data from the various narrowband calls transported by the VC.

AAL2 connection control signalling concerned with the control of individual AAL2 connections within an AAL2 VC is also used to forward information about a connection to set up the receiving IWF5. This connection control signalling takes the form of a set up message sent on a dedicated channel within the AAL2 VC or a separate AAL 5 VC. AAL2 connection control signalling is concerned with conveying the identities of the channels occupied by the individual AAL2 connections, as well as with other AAL2 parameters necessary for correct operation of the sending and receiving IWFs, for example the identification of the voice coding algorithm to be used on the call. These connection control signalling messages are used during the set up and release phases of individual AAL2 connections.

Figure 4:
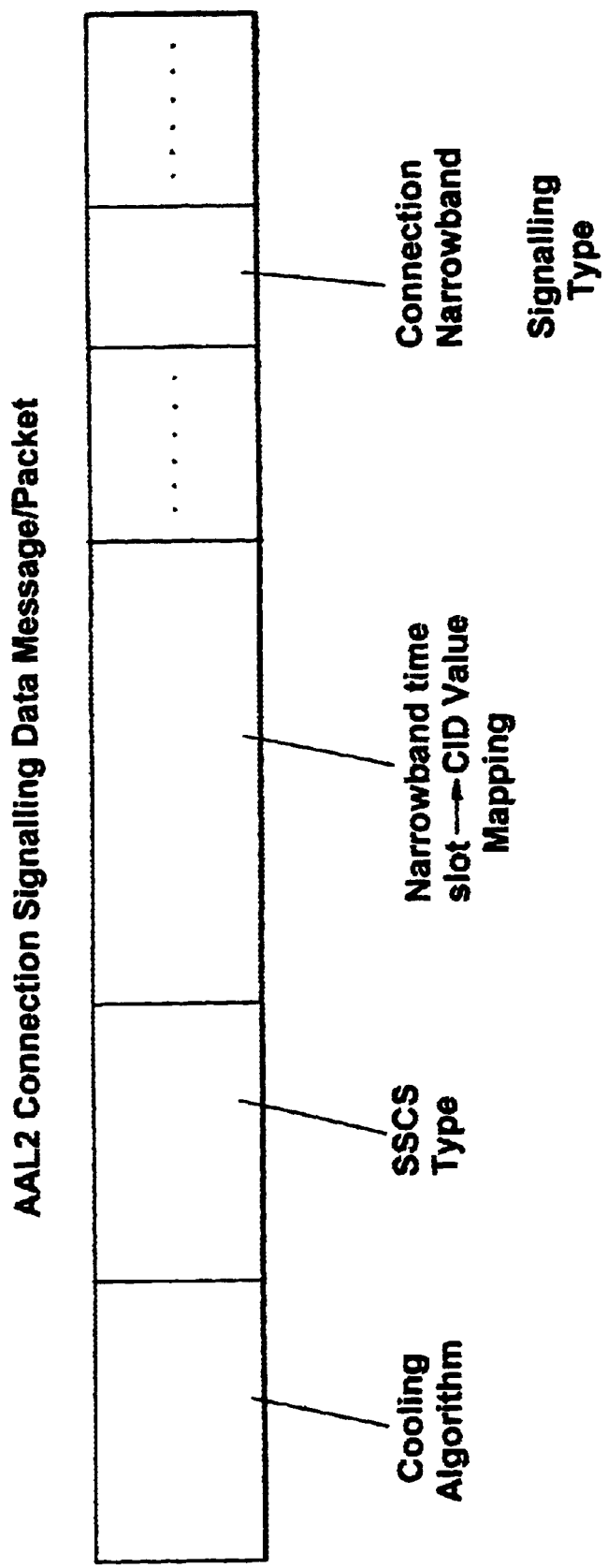
FIG. 4 is a schematic diagram illustrating an inventive AAL2 connection signalling packet within the AAL2 virtual circuit data stream.

FIG. 4 shows the field and format arrangement for AAL2 connection control signalling messages of the invention and includes; information on the coding algorithm to be used during the call; the SSCS type of a call; the call timeslot to channel identification value mapping information; the narrowband call signalling type information. The mapping information allows the destination IWF to reassemble timeslot by timeslot the narrowband call for forwarding via a narrowband transmission facility 4 (e.g. E1 or DS1) to the connected narrowband network 2. The narrowband call signalling type information allows the IWF to associate the correct narrowband signalling information with the new call, by being directed to the channel previously set up for transport of the signalling information. Some narrowband signalling systems include the signalling information inband (ie as part of the user data), and use of this signalling system can also be conveyed to the receiving IWF.

Use of narrowband signalling type information in the AAL2 signalling allows the transport on a single AAL2 VC of narrowband calls with different narrowband signalling systems. This extra information field conveys the type and variant of narrowband signalling associated with a given AAL2 connection. This information is conveyed by the AAL2 connection control signalling at AAL2 connection set up time to the receiving IWF. The AAL2 connection control signalling function at the receiving IWF then transfers this narrowband signalling information to the narrowband signalling handling function, which is then provided with the per-call information that it requires to correctly determine which narrowband call is associated with which type and variant of narrowband signalling system, regardless of how many different signalling systems are in use for a given AAL2 VC. A single AAL2 VC is thus enabled to carry narrowband calls associated with multiple different narrowband signalling systems.

In use, VCs are set up within the ATM network 3 between IWFs 5 which are in turn connected to a narrowband network 2 by narrowband transmission facilities 4. Upon set up of an AAL2 VC, an AAL2 channel is allocated to carry AAL2 signalling for individual call set up within the VC. Another AAL2 channel is also be allocated to carry the narrowband signalling associated with individual narrowband calls. Alternatively, both the AAL2 signalling and the narrowband signalling may be carried over an AAL5 VC separate from the AAL2 VC so that the latter would then be used solely for the transport of narrowband calls. Once the AAL2 VC is established, narrowband calls are routed along it in individual channels set up by means of the AAL2 signalling connection message protocol as described above with reference to FIG. 4, detailing the mapping of the call timeslot on the narrowband transmission facility 4 to the channel value to be used for this timeslot as well as the narrowband call signalling system type. Once an AAL2 connection is set up, the call user data is placed on to the AAL2 channel assigned for this purpose and transported across the ATM network 3 to the receiving IWF. Here, call user data and any associated narrowband signalling information are retrieved and the narrowband signalling is correctly interpreted by using the previously received AAL2 signalling information as described above.

The foregoing describes the invention including a preferred form thereof. Alterations and modifications as will be obvious to those skilled in the art are intended to be incorporated within the scope hereof.

What is claimed is:

1. A method of transporting multiple narrowband calls between first and second narrowband networks across an ATM network, wherein said multiple calls include at least two calls having different narrowband signalling system types; the method comprising:

forming a virtual circuit;

forming call connections within said circuit for each of said narrowband calls, wherein for each call connection within said circuit, corresponding narrowband signalling system type information is forwarded within a data packet comprising the corresponding narrowband signalling system type.

2. An apparatus for transporting narrowband calls of different signalling system type between first and second narrow band networks across an ATM network, the apparatus comprising:

means for forming a virtual circuit;

means for forming call connections within said circuit for each of said narrowband calls, by forwarding a call connection signalling information data packet comprising a narrowband signalling system type field containing the narrowband signalling system type of said call.

3. An apparatus as claimed in claim 2, wherein said means is an interworking function.

4. An apparatus as claimed in claim 2, wherein said virtual circuit is an AAL2 virtual circuit.

5. An apparatus for transporting narrowband calls of different signalling system type between first and second narrow band networks across an ATM network, the apparatus comprising:

means for forming a virtual circuit;

means for forming call connections within said circuit for each of said narrowband calls, by receiving a call connection data packet comprising a narrowband signalling system type field containing the narrowband signalling system type of said call.

6. An apparatus as claimed in claim 5, wherein said means is an interworking function.

7. An apparatus as claimed in any one of claim 5, wherein said virtual circuit is an AAL2 virtual circuit.

8. A telecommunications system for transporting narrowband calls of different signalling system type between first and second narrow band networks across an ATM network, the system comprising:

means for forming a virtual circuit between two interworking functions (IWF);

means for forming call connections within said circuit for each of said narrowband calls by transferring between said IWFs a call connection data packet comprising a narrowband signalling system type field containing the narrowband signalling system type of said call.

* * * * *